United States Patent
Shimizu (10) Patent No.: US 9,152,217 B2
(45) Date of Patent: Oct. 6, 2015

(54) INFORMATION PROCESSING APPARATUS CONFIGURED TO SHIFT BETWEEN PLURALITY OF POWER MODES AND REDUCE THE TIME TAKEN TO RETURN TO A STANDBY STATE

(75) Inventor: Koji Shimizu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 13/602,542

(22) Filed: Sep. 4, 2012

(65) Prior Publication Data

US 2013/0061080 A1 Mar. 7, 2013

(30) Foreign Application Priority Data

Sep. 7, 2011 (JP) ................................. 2011-195042

(51) Int. Cl.
- G06F 1/00 (2006.01)
- G06F 1/32 (2006.01)
- H04N 1/00 (2006.01)

(52) U.S. Cl.
CPC ............ *G06F 1/3284* (2013.01); *G06F 1/3203* (2013.01); *G06F 1/3287* (2013.01); *H04N 1/00891* (2013.01); *H04N 1/00896* (2013.01); *H04N 1/00904* (2013.01); *H04N 1/00928* (2013.01); *G06F 1/3215* (2013.01); *H04N 2201/0094* (2013.01); *Y02B 60/1267* (2013.01); *Y02B 60/1282* (2013.01); *Y02B 60/32* (2013.01)

(58) Field of Classification Search
CPC ............................... G06F 1/3203; G06F 1/3215
See application file for complete search history.

(56) References Cited

U.S. PATENT DOCUMENTS

| 5,944,828 | A | * | 8/1999 | Matsuoka | ...................... 713/323 |
| 2006/0119878 | A1 | * | 6/2006 | Kurosaki | ...................... 358/1.14 |
| 2011/0083027 | A1 | * | 4/2011 | Takagi | .......................... 713/323 |

FOREIGN PATENT DOCUMENTS

| JP | H11161385 A | | 6/1999 |
| JP | 2002108145 A | * | 4/2002 |
| JP | 2005-215856 A | | 8/2005 |
| JP | 2005-266995 A | | 9/2005 |
| JP | 2006-92474 | | 4/2006 |
| JP | 2009-223866 A | | 10/2009 |
| JP | 2010-191895 A | | 9/2010 |

* cited by examiner

*Primary Examiner* — Mohammed Rehman
*Assistant Examiner* — Gayathri Sampath
(74) *Attorney, Agent, or Firm* — Carter, DeLuca, Farrell & Schmidt, LLP (57) ABSTRACT

An information processing apparatus capable of reducing time taken to return to a standby state after turn-off of a power switch in a power saving state. A power supply supplies power to a CPU and a RAM in a standby state, supplies power to the RAM without supplying power to the CPU in a second waiting state caused by turning off the power switch, and supplies power to the RAM without supplying power to the CPU in the power saving state caused without having the power switch turned off when a shift-to-power saving state requirement defined in advance is satisfied. A power supply controller causes the apparatus to shift from the second waiting state to the standby state using a standby memory image. The CPU writes the standby memory image in the RAM for storage in the power saving state.

20 Claims, 9 Drawing Sheets

INFORMATION PROCESSING APPARATUS CONFIGURED TO SHIFT BETWEEN PLURALITY OF POWER MODES AND REDUCE THE TIME TAKEN TO RETURN TO A STANDBY STATE

BACKGROUND OF THE INVENTION

1. Field of the Invention

The present invention relates to an information processing apparatus having a plurality of power modes, and more particularly to shifting between a plurality of power modes.

2. Description of the Related Art

In recent years, as an image forming apparatus, which is an example of an information processing apparatus, is multi-functionalized, the construction thereof becomes complicated, and it takes more time to start up the image forming apparatus.

To solve this problem, there have been proposed various techniques for reducing time taken to start up the image forming apparatus (see e.g. Japanese Patent Laid-Open Publication No. 2006-92474).

The information processing apparatus disclosed in Japanese Patent Laid-Open Publication No. 2006-92474 has a standby mode, a first energy saving mode, and a second energy saving mode, as power modes thereof. When the information processing apparatus is in the first energy saving mode, only a RAM and the minimum number of devices necessary for returning from the first energy saving mode are energized. Further, in the first energy saving mode, return data (first return data) necessary for returning from the first energy saving mode are stored in the RAM, and when a return event causing a return from the first energy saving mode occurs, the information processing apparatus returns from the first energy saving mode to the standby mode based on the return data stored in the RAM. Further, when the information processing apparatus is in the second energy saving mode, only the minimum number of devices necessary for returning from the second energy saving mode are energized. In the second energy saving mode, the information processing apparatus stores in advance return data (second return data) necessary for returning from the second energy saving mode in a hard disk, and when a return event causing a return from the second energy saving mode occurs, the information processing apparatus returns from the second energy saving mode to the standby mode based on the return data stored in the hard disk.

When shifting from the standby mode to the first energy saving mode, the disclosed information processing apparatus stores the first return data in the RAM, and stores the second return data in the hard disk. If the power switch is turned off in the first energy saving mode, the information processing apparatus shifts to the second energy saving mode. Then, when a return event causing a return from the second energy saving mode occurs, power is supplied to the whole information processing apparatus, and the information processing apparatus returns to the standby mode based on the second return data stored in the hard disk.

To cause the information processing apparatus to return from the second energy saving mode to the standby mode, the second return data read from the hard disk is restored in the RAM, and then the information processing apparatus is caused to return to the standby mode based on the second return data. In this information processing apparatus, however, it takes time to restore the second return data stored in the hard disk in the RAM. Therefore, in the case of the information processing apparatus disclosed in Japanese Patent Laid-Open Publication No. 2006-92474, if the power switch is turned off in the first energy saving mode to cause the apparatus to shift to the second energy saving mode, it takes time before the information processing apparatus returns to the standby mode.

SUMMARY OF THE INVENTION

The present invention provides an information processing apparatus that is capable of reducing time taken to return to a standby state after turn-off a power switch in a power saving state, a method of controlling the information processing apparatus, and a storage medium.

In a first aspect of the present invention, there is provided an information processing apparatus that has a plurality of power modes, comprising a power supply unit configured to supply power to an information processing unit and a storage unit that stores information used by the information processing unit, when the information processing apparatus is in a standby mode in which the information processing unit can perform information processing, supply power to the storage unit without supplying power to the information processing unit, when the information processing apparatus is in a first power saving mode to which the information processing apparatus is caused to shift when having a power switch turned off, and supply power to the storage unit without supplying power to the information processing unit, when the information processing apparatus is in a second power saving mode to which the information processing apparatus is caused to shift without having the power switch turned off on condition that a shift-to-power saving state requirement defined in advance is satisfied, a first control unit configured to cause the information processing apparatus to shift from the first power saving mode to the standby mode by using first status information stored in the storage unit, and a storing unit configured to store the first status information in the storage unit such that the storage unit stores the first status information in a state of the second power saving mode.

In a second aspect of the present invention, there is provided an information processing apparatus that has a plurality of power modes, comprising a power supply unit configured to supply power to an information processing unit and a storage unit that stores information used by the information processing unit, when the information processing apparatus is in a standby mode in which the information processing unit can perform information processing, supply power to the storage unit without supplying power to the information processing unit, when the information processing apparatus is in a first power saving mode to which the information processing apparatus is caused to shift when having a power switch turned off, and supply power to the storage unit without supplying power to the information processing unit, when the information processing apparatus is in a second power saving mode to which the information processing apparatus is caused to shift without having the power switch turned off on condition that a shift-to-power saving state requirement defined in advance is satisfied, a first control unit configured to cause the information processing apparatus to shift from the first power saving mode to the standby mode by using first status information stored in the storage unit, and a storing unit configured to store the first status information in the storage unit when the power switch is turned off in a state of the second power saving mode.

In a third aspect of the present invention, there is provided a method of controlling an information processing apparatus that has a plurality of power modes, comprising supplying power to an information processing unit and a storage unit that stores information used by the information processing unit, when the information processing apparatus is in a standby mode in which the information processing unit can perform information processing, supplying power to the storage unit without supplying power to the information processing unit, when the information processing apparatus is in a first power saving mode to which the information processing apparatus is caused to shift when having a power switch turned off, supplying power to the storage unit without supplying power to the information processing unit, when the information processing apparatus is in a second power saving mode to which the information processing apparatus is caused to shift without having the power switch turned off on condition that a shift-to-power saving state requirement defined in advance is satisfied, causing the information processing apparatus to shift from the first power saving mode to the standby mode by using first status information stored in the storage unit, and storing the first status information in the storage unit such that the storage unit stores the first status information in a state of the second power saving mode.

In a fourth aspect of the present invention, there is provided a method of controlling an information processing apparatus that has a plurality of power modes, comprising supplying power to an information processing unit and a storage unit that stores information used by the information processing unit, when the information processing apparatus is in a standby mode in which the information processing unit can perform information processing, supplying power to the storage unit without supplying power to the information processing unit, when the information processing apparatus is in a first power saving mode to which the information processing apparatus is caused to shift when having a power switch turned off, supplying power to the storage unit without supplying power to the information processing unit, when the information processing apparatus is in a second power saving mode to which the information processing apparatus is caused to shift without having the power switch turned off on condition that a shift-to-power saving state requirement defined in advance is satisfied, causing the information processing apparatus to shift from the first power saving mode to the standby mode by using first status information stored in the storage unit, and storing the first status information in the storage unit when the power switch it turned off in a state of the second power saving mode.

In a fifth aspect of the present invention, there is provided a non-transitory computer-readable storage medium storing a computer-executable program for causing a computer to execute a method of controlling an information processing apparatus that has a plurality of power modes, wherein the method comprises supplying power to an information processing unit and a storage unit that stores information used by the information processing unit, when the information processing apparatus is in a standby mode in which the information processing unit can perform information processing, supplying power to the storage unit without supplying power to the information processing unit, when the information processing apparatus is in a first power saving mode to which the information processing apparatus is caused to shift when having a power switch turned off, supplying power to the storage unit without supplying power to the information processing unit, when the information processing apparatus is in a second power saving mode to which the information processing apparatus is caused to shift without having the power switch turned off on condition that a shift-to-power saving state requirement defined in advance is satisfied, causing the information processing apparatus to shift from the first power saving mode to the standby mode by using first status information stored in the storage unit, and storing the first status information in the storage unit such that the storage unit stores the first status information in a state of the second power saving mode.

In a sixth aspect of the present invention, there is provided a non-transitory computer-readable storage medium storing a computer-executable program for causing a computer to execute a method of controlling an information processing apparatus that has a plurality of power modes, wherein the method comprises supplying power to an information processing unit and a storage unit that stores information used by the information processing unit, when the information processing apparatus is in a standby mode in which the information processing unit can perform information processing, supplying power to the storage unit without supplying power to the information processing unit, when the information processing apparatus is in a first power saving mode to which the information processing apparatus is caused to shift when having a power switch turned off, supplying power to the storage unit without supplying power to the information processing unit, when the information processing apparatus is in a second power saving mode to which the information processing apparatus is caused to shift without having the power switch turned off on condition that a shift-to-power saving state requirement defined in advance is satisfied, causing the information processing apparatus to shift from the first power saving mode to the standby mode by using first status information stored in the storage unit, and storing the first status information in the storage unit when the power switch it turned off in a state of the second power saving mode.

According to the present invention, an operation is promptly performed for returning from a state of the apparatus caused by turning off the power switch, whereby it is possible to reduce the time taken to return from the state.

Further features of the present invention will become apparent from the following description of exemplary embodiments with reference to the attached drawings.

BRIEF DESCRIPTION OF THE DRAWINGS

FIG. 8 is a flowchart of a startup process performed when the image forming apparatus shown in FIG. 1 has a main switch thereof turned on.

DESCRIPTION OF THE EMBODIMENTS

The present invention will now be described in detail below with reference to the accompanying drawings showing embodiments thereof. The component elements described in the embodiment are only described by way of example, and are by no means intended to limit the scope of the present invention to them alone. Further, a description will be given of an image forming apparatus as an example of an information processing apparatus.

Figure 1:
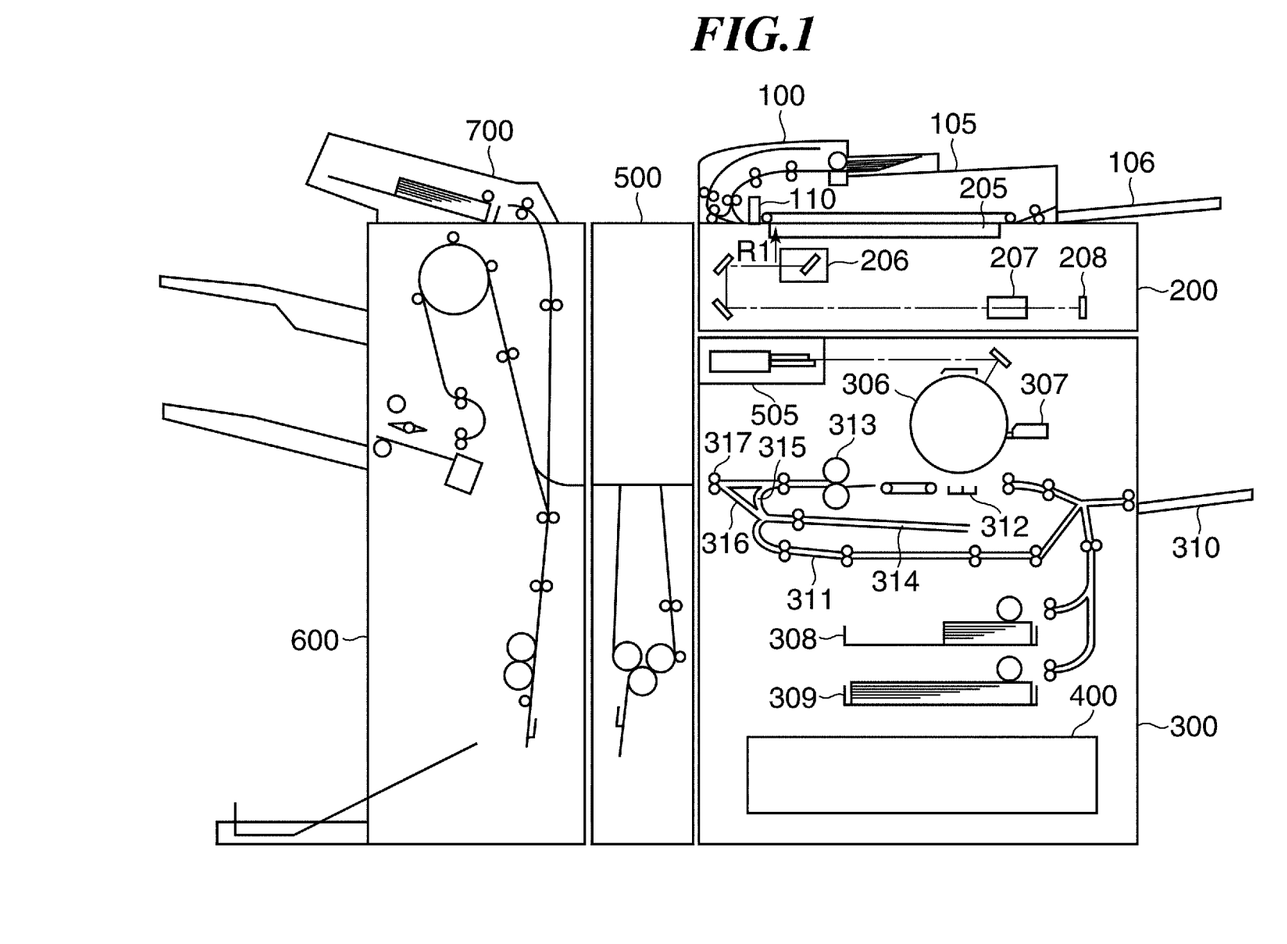
FIG. 1 is a schematic view of an image forming apparatus as an example of an information processing apparatus according to an embodiment of the present invention.

FIG. 1 schematically shows the arrangement of the image forming apparatus as an example of the information processing apparatus according to an embodiment of the present invention.

The illustrated image forming apparatus includes an image reader 200, a printer section 300, a folder 500, and a finisher 600. An document feeder 100 is mounted on a top of the image reader 200.

The document feeder 100 sequentially feeds originals set on a document tray 105 one by one from the leading page. The originals are conveyed via a curved path to an original platen glass 205.

To read an original having an image formed on one side thereof (single-sided original), a trailing end of the single-sided original is positioned at a reading position R1 on the original platen glass 205. Then, a scanner unit 206 is shifted from left to right, as viewed in FIG. 1, to thereby read the original. Hereinafter, such reading of the original is referred to as the "stationary original reading mode".

On the other hand, there is also a case where a single-sided original is read while being shifted to the reading position R1 at a predetermined reading speed, with the scanner unit 206 fixed to the reading position R1. Such reading of the original is referred to as the "moving original reading mode". In both of the reading modes, an original, after being read, is discharged onto a discharge tray 106.

To read an original having images formed on both sides thereof (double-sided original), in general, the scanner unit 206 reads the image on the front side of the original. The image on the back side of the original is read using an optical unit 110 disposed in the document feeder 100. Note that optical unit 110 is provided with an image sensor and a light source (neither of which is shown).

An optical image obtained as a result of reading the image by the scanner unit 206 is formed on an image sensor 208 via a lens 207. The image sensor 208 outputs an electric signal (analog signal) corresponding to the optical image. This analog signal is converted to image data, which is a digital signal, by a printer controller (not shown in FIG. 1), and is sent to an exposure controller 505.

The exposure controller 505 irradiates a laser beam modulated according to the image data onto a photosensitive drum 506. This forms an electrostatic latent image according to the image data on the photosensitive drum 506. The electrostatic latent image is developed by a developing device 507 into a toner image.

A sheet is conveyed from one of cassettes 308 and 309 and a manual sheet feeder 310 to a transfer position, at which the toner image on the photosensitive drum 506 is transferred onto the sheet by a transfer section 312. Note that in the case of double-sided printing, the sheet is fed from a double-sided conveying path 311 to the transfer position.

The sheet having the toner image transferred thereon is conveyed to a fixing section 313. The fixing section 313 performs fixing processing for fixing the toner image on the sheet. The sheet having undergone the fixing processing is once guided from a path 315 to a path 314 by a flapper (not shown). After the trailing end of the sheet has left the path 315, the sheet is switched back to be guided from the path 316 to a discharge roller 317.

As a consequence, the sheet is discharged face-down, i.e. with a toner image-transferred surface thereof facing downward, from the discharge roller 317. This discharge of the sheet is referred to as "inverted discharge". For example, in a case where a plurality of originals are read using the document feeder 100 and are printed, if sheets are discharged face-down, images of the originals can be sequentially formed on the sheets in the order of pages starting from the leading page.

Note that to perform image formation by feeding a hard sheet, such as an OHP (overhead projector) sheet, from the manual sheet feeder 310, the sheet is discharged from the discharge roller 317 face-up, i.e. with a toner image-transferred surface thereof facing upward, without being guided into the path 315.

When images are formed on both sides of the sheet, the sheet is guided from the fixing section 313 into the path 315 and then to the path 314. Then, the sheet is switched back immediately after the trailing end of the sheet has left the path 315, and is guided into the double-sided conveying path 311 by a flapper (not shown). The sheet is sent to the transfer position via the double-sided conveying path 311 again, and a toner image is transferred onto the back side of the sheet by the transfer section 312. After that, the sheet is subjected to the fixing processing by the fixing section 313, and is discharged, as described above.

The lengths of paths and the arrangement of rollers are defined and the drive system is divided, such that sheet conveyance can be performed even in a state where five half-size sheets, such as sheets of A4 or B5 size, are guided into one circular path extending from the transfer section 312 and returning to the transfer section 312 again via the double-sided conveying path 311.

Note that during double-sided copy, sheets are discharged with odd number pages facing downward. This makes it possible to stack the sheets in a correct page order also in the double-sided copy.

In the case of the illustrated image forming apparatus, a sheet discharged from the discharge roller 317 is sent to the folder 500. Here, the folder 500 performs Z-folding processing for folding the sheet into a Z shape. When the Z-folding processing is designated for a sheet of A3 or B4 size, the folder 500 performs the Z-folding processing on the sheet, and then sends the sheet to the finisher 600.

Note that when the Z-folding processing is not designated, sheets of sizes other than the A3 or B4 size are sent to the finisher 600 without being subjected to the Z-folding processing in the folder 500.

The finisher 600 performs bookbinding processing, stapling processing, punching processing, and so forth. An inserter 700 is mounted on top of the finisher 600. The inserter 700 feeds e.g. cover sheets and interleaved sheets to the finisher 600.

A controller control section 400 controls the image forming apparatus by communicating with the image reader 200, the printer section 300, the folder 500, and the finisher 600.

Figure 2:
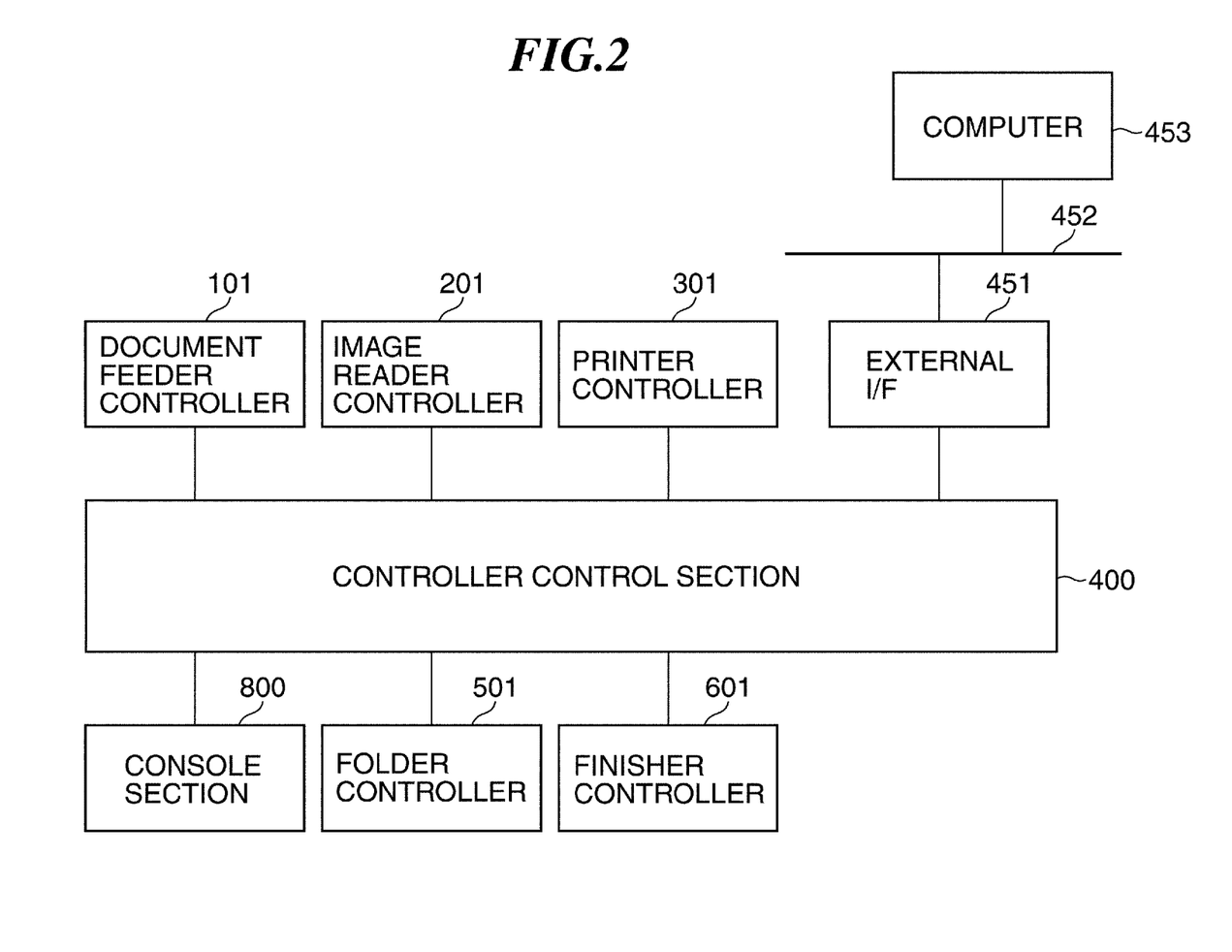
FIG. 2 is a block diagram of a control system of the image forming apparatus shown in FIG. 1.

FIG. 2 is a block diagram of a control system of the image forming apparatus shown in FIG. 1.

Referring to FIG. 2, connected to the controller control section 400 are a document feeder controller 101, an image reader controller 201, a printer controller 301, a folder controller 501, a finisher controller 601, and a console section 800. Further, the controller control section 400 is connected to an external bus 452 via an external interface (I/F) 451. In the illustrated example, a computer 453 is connected to the external bus 452. Note that as the external bus 452, a network or a USB is used for example.

The document feeder controller 101 controls the document feeder 100 under the control of the controller control section 400. The image reader controller 201 controls the image reader 200 under the control of the controller control section 400. The printer controller 301 controls the printer section 300 under the control of the controller control section 400. The folder controller 501 controls the folder 500 under the control of the controller control section 400. The finisher controller 601 controls the finisher 600 under the control of the controller control section 400.

The controller control section 400 acquires image data obtained as a result of reading of an original, by controlling the document feeder controller 101 and the image reader controller 201 according to settings of the console section 800 or instructions from the computer 453. Further, the controller control section 400 performs printing on sheets based on image data by controlling the printer controller 301. Further, the controller control section 400 performs stapling processing or punching processing on sheets by controlling the folder controller 501 and the finisher controller 601.

Furthermore, the controller control section 400 receives print data (image data) from the computer 453 via the external interface 451, and performs printing processing based on the image data. Further, the controller control section 400 transmits image data stored in a hard disk (HD), referred to hereinafter, to the computer 453.

Figure 3:
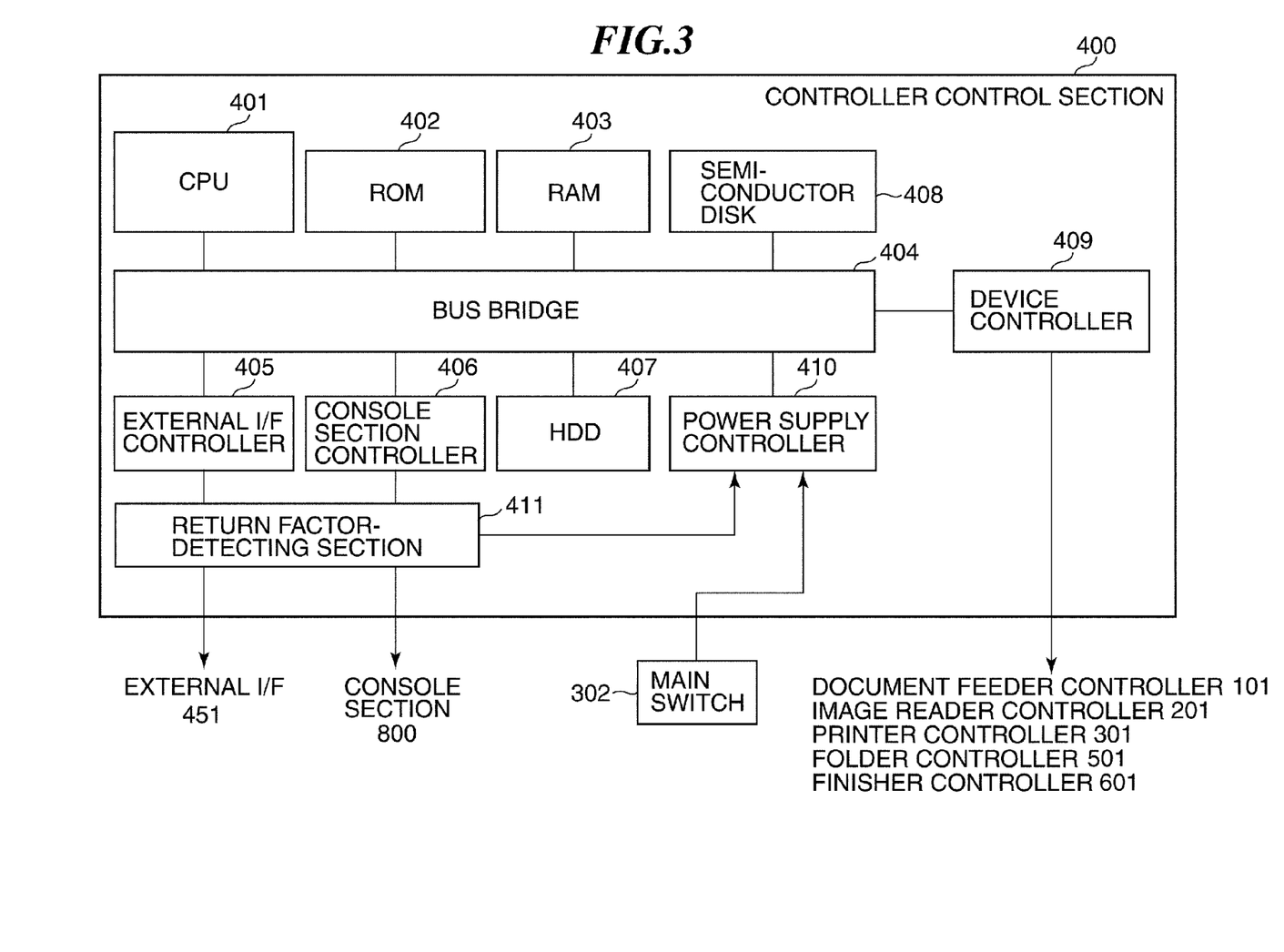
FIG. 3 is a block diagram of a controller control section appearing in FIG. 2.

FIG. 3 is a block diagram of the controller control section 400 appearing in FIG. 2.

Referring to FIG. 3, the controller control section 400 includes a CPU 401 that executes an operating system (OS). A bus bridge 404 is connected to the CPU 401, and a ROM 402 and a RAM 403 are connected to the bus bridge 404. A boot program for booting the CPU 401 is stored in the ROM 402, and control data for controlling the CPU 401 is temporarily stored in the RAM (nonvolatile memory) 403. The RAM 403 is also used as a work area by the CPU 401.

Note that the ROM 402 stores settings indicating whether or not to enable a second waiting state P103, referred to hereinafter. The settings are sent to a power supply controller 410, described hereinafter.

A semiconductor disk (auxiliary storage device) 408 stores main programs including the OS. Further, the semiconductor disk 408 temporarily stores image data when the image forming apparatus is in operation. A HDD (auxiliary storage device) 407 stores image data acquired by a user and image data obtained when the user has edited images using the console section 800, as described hereinafter.

As shown in FIG. 3, a console section controller 406 and an external interface (I/F) controller 405 are connected to the bus bridge 404, and are connected to the console section 800 and the external interface 451 via a return-from-power saving mode factor-detecting section (hereinafter referred to as the "return factor-detecting section") 411, respectively.

The CPU 401 communicates with a device controller 409 via the bus bridge 404. The device controller 409 controls the document feeder controller 101, the image reader controller 201, the printer controller 301, the folder controller 501, and the finisher controller 601.

The power supply controller 410 performs power supply control by detecting the state of a main switch (power switch) 302 for supplying power to the image forming apparatus. More specifically, the power supply controller 410 controls the supply of power to the document feeder controller 101, the image reader controller 201, the printer controller 301, the folder controller 501, and the finisher controller 601.

In a power saving mode and a second standby mode, described hereinafter, the power supply control is performed by the power supply controller 410. Further, the HDD 407 and the semiconductor disk 408 are independently supplied with power, and the power supply controller 410 controls supply and cut-off of power to the HDD 407 and the semiconductor disk 408.

The return factor-detecting section 411 detects a return factor causing a return from the power saving mode. More specifically, when the image forming apparatus is in the power saving mode, if a main switch (SW) key of the console section 800 is depressed or a print job is input via the external interface 451, for example, the return factor-detecting section 411 notifies the power supply controller 410 of the fact. Upon receipt of the notification, the power supply controller 410 supplies power to the image forming apparatus to thereby cause the image forming apparatus to return from the power saving mode, as described hereinafter.

Figure 4:
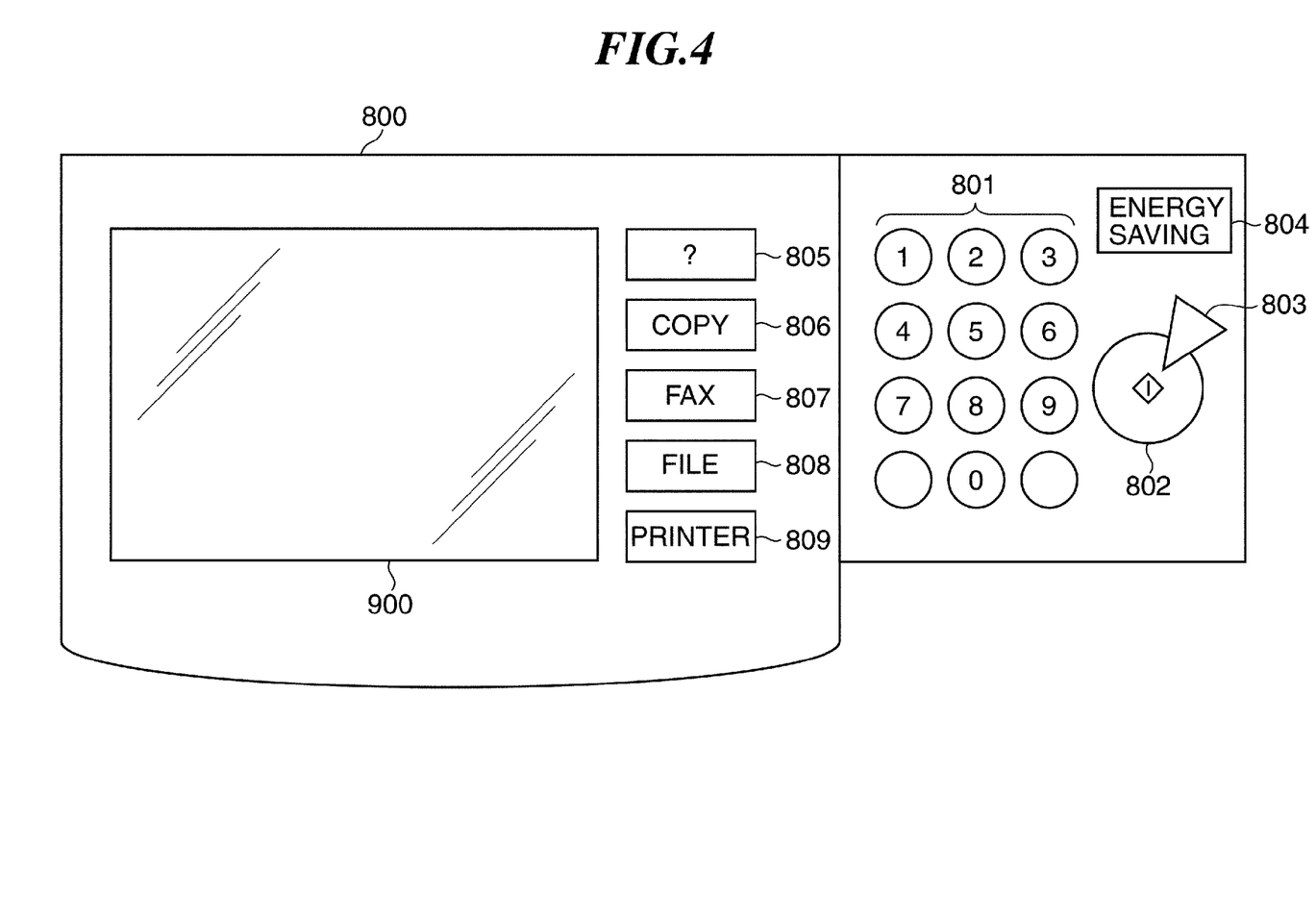
FIG. 4 is a schematic appearance view of a console section appearing in FIG. 2.

FIG. 4 is a schematic appearance view of the console section 800 appearing in FIG. 2.

The console section 800 includes an LCD display section 900. The LCD display section 900 has a touch panel sheet attached to an LCD (liquid crystal display). The LCD display section 900 displays an operation screen concerning the image forming apparatus, and in response to a key operation on the operation screen, sends position information associated with the key operation to the controller control section 400.

Ten keys 801 are used for inputting numeric characters, such as the number of sheets for copying. A start key 802 is depressed e.g. to start a copy operation or an original reading operation after conditions desired by the user have been set. A stop key 803 is used to stop an operation being processed. An energy saving key 804 is used when the user causes the image forming apparatus to shift to an energy saving mode and return from the energy saving mode.

A guide key 805 is used when the user is unfamiliar with the functions of the respective keys of the console section 800. When the guide key 805 is depressed, descriptions of the keys are displayed on the LCD display section 900. A copy mode key 806 is used to perform copying. A facsimile key 807 is used to configure settings of a facsimile. A file key 808 is used to output file data. A printer key 809 is used to configure settings concerning print output from an external device, such as a computer.

Figure 5:
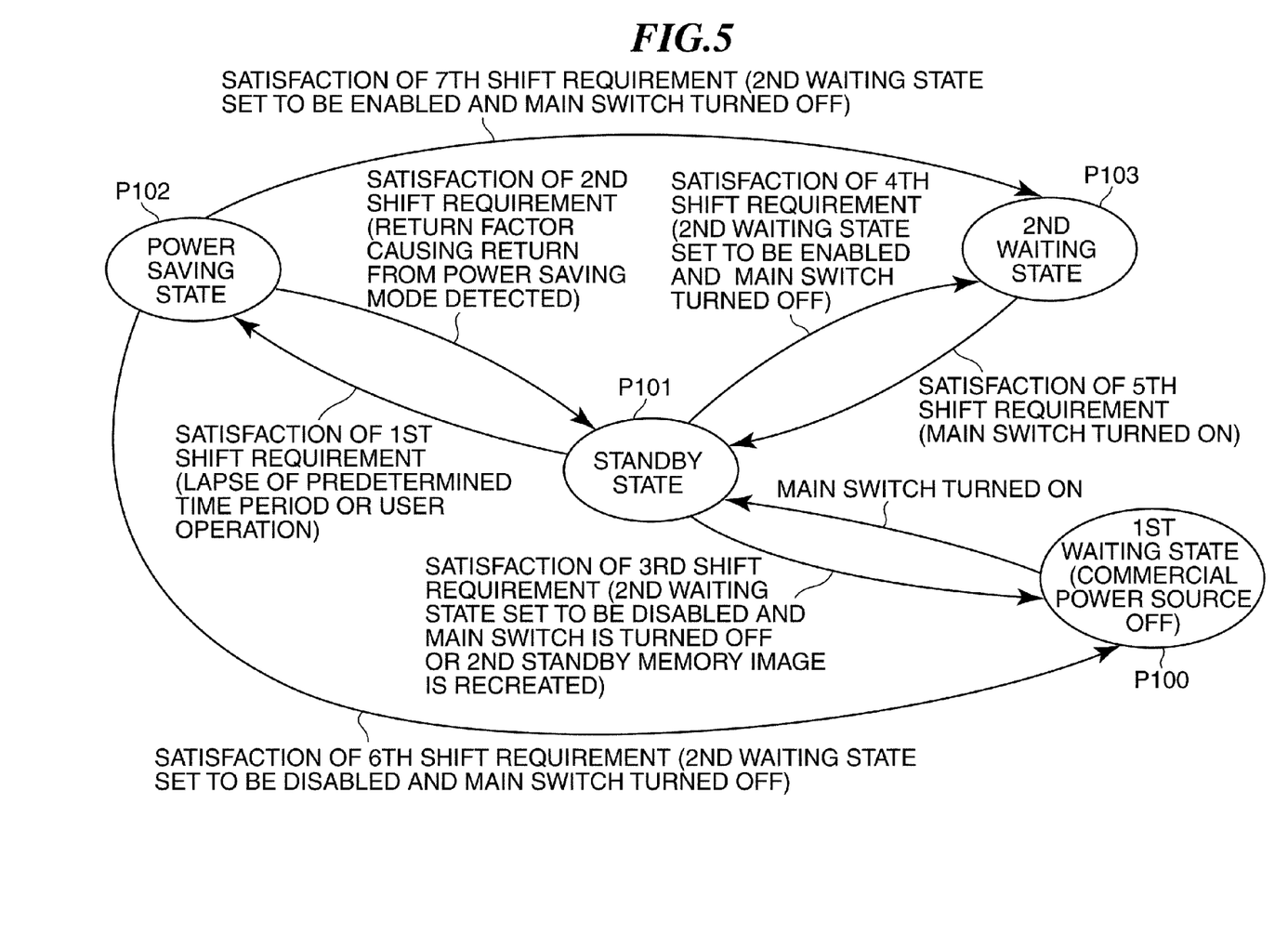
FIG. 5 is a view useful in explaining changes in a power supply state of the image forming apparatus shown in FIG. 1.

FIG. 5 is a view useful in explaining changes in a power supply state of the image forming apparatus shown in FIG. 1. Further, FIG. 6 is a block diagram useful in explaining a power supply system of the controller control section 400 shown in FIG. 3.

Figure 6:
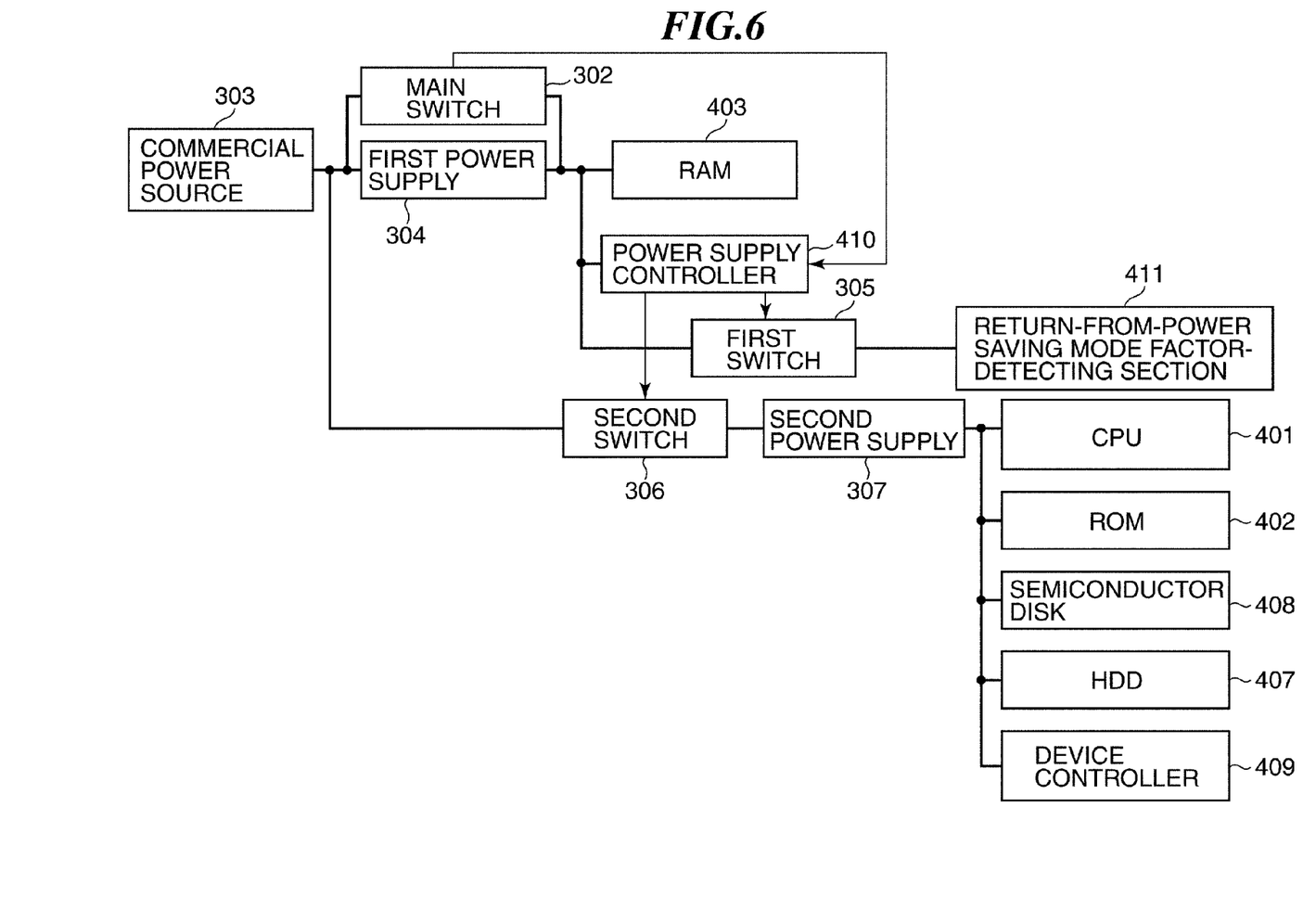
FIG. 6 is a block diagram useful in explaining a power supply system of the controller control section appearing in FIG. 3.

Referring to FIGS. 5 and 6, a first waiting state P100 is a state in which a commercial power source (power supply from an AC outlet) 303 is off, and hence the image forming apparatus is not supplied with power (this state is also referred to as the "complete off state"). In the first waiting state P100, no power is supplied to the image forming apparatus, so that none of electric operations are accepted by the image forming apparatus.

When the commercial power source 303 is connected, if the second waiting state P103 (first power saving mode), referred to hereinafter, has been disabled, it is possible to cut off a first power supply 304 by the power supply controller 410.

In a standby state (standby mode) P101, the image forming apparatus is operable at any time, and can accept all operations. In this standby state P101, the main switch 302 has been turned on. In the standby state P101, power is supplied from the first power supply 304 to the RAM 403, the power supply controller 410, the first switch 305, and the return factor-detecting section 411. The power supply controller 410 controls the on/off of each of the main switch 302, the first switch 305, and the second switch 306. The first switch 305 is provided between the first power supply 304 and the return factor-detecting section 411. When the first switch 305 is turned on by the power supply controller 410, power is supplied from the first power supply 304 to the return factor-detecting section 411. Further, the second switch 306 is provided between the commercial power source 303 and the second power supply 307. When the second switch 306 is turned on by the power supply controller 410, power is supplied from the commercial power source 303 to the second power supply 307. Note that when the second switch 306 is on, the second power supply 307 supplies power to the CPU 401, the ROM 402, the semiconductor disk 408, the HDD 407, and the device controller 409.

In a power saving state (second power saving mode) P102, it is made possible to detect a return factor causing a return from the power saving mode using the return factor-detecting section (return factor-detecting unit) 411, and the power consumption of the image forming apparatus is lower than in the standby state P101. In the illustrated example, power is supplied to the power supply controller 410, the RAM 403, and the return factor-detecting section 411. In this embodiment, the power supply controller 410 turns on the first power supply 304 and the first switch 305, and turns off the second switch 306.

In the power saving state P102, the status of programs operating on the image forming apparatus and data immediately before the image forming apparatus shifts from the standby state to the power saving state P102 is stored in the RAM 403 as a memory image. In this embodiment, the memory image is referred to as the "power saving memory image (second status information)". The power saving memory image represents a status of the image forming apparatus, and is data created by forming the status of the CPU (information on setting registers), the status of electronic devices connected to the CPU 401, and the working states of the OS and applications immediately before the image forming apparatus shifts to the power saving mode, as a memory image. The data of this memory image is necessary for executing a restoring process for returning from the power saving mode.

The second waiting state P103 is a standby state for causing the image forming apparatus to shift to the standby state P101 at a high speed, and the power consumption of the image forming apparatus is lower than in the power saving state P102. In the second waiting state P103, power is supplied to the power supply controller 410 and the RAM 403. The power supply controller 410 turns off the second switch 306 and the first switch 305, and turns on the first power supply 304. As a consequence, power is supplied from the first power supply 304 to the RAM 403 and the power supply controller 410.

In the second waiting state P103, the status of programs operating on the image forming apparatus and data immediately after the image forming apparatus has shifted from the first waiting state P100 to the standby state P101 is stored in the RAM 403 as a memory image. In this embodiment, the memory image is referred to as the "standby memory image (first status information)". The standby memory image represents a status of the image forming apparatus immediately after the image forming apparatus has been started up, and is data created by forming the status of the CPU (information on setting registers), the status of the electronic devices connected to the CPU, and the working states of the OS and applications, as a memory image. The data of this memory image is necessary for executing a restoring process for returning from the power saving mode.

The power saving memory image and the standby memory image, stored in the RAM 403, are different in the following points:

As described hereinabove, the power saving memory image represents the status of the image forming apparatus immediately before the image forming apparatus shifts from the standby state P101 to the power saving state P102. For example, an image actually being displayed on the LCD display section 900 is an image immediately before the image forming apparatus shifts to the power saving state P102, and hence this image can be different each time.

On the other hand, the standby memory image represents the status of the image forming apparatus immediately after the image forming apparatus has shifted from the first waiting state P100 to the standby state P101. Therefore, in this case, for example, an image displayed on the LCD display section 900 is the same each time, so that it is possible to reuse the memory image already stored.

In the present embodiment, the standby memory image is stored in the HDD 407 or the semiconductor disk 408, as described hereinafter. In the present embodiment, a description is given assuming that the standby memory image is stored in the HDD 407. However, it is also possible to change the hardware configuration of the image forming apparatus and an image displayed on the LCD display section 900 immediately after the image forming apparatus has shifted from the first waiting state P100 to the standby state P101, and therefore it is effective to periodically recreate, i.e. update the standby memory image.

For example, the CPU 401 may cause the image forming apparatus to shift to the first waiting state P100 at predetermined time intervals, and then create the standby memory image immediately after the image forming apparatus has shifted from the first waiting state P100 to the standby state P101.

Next, a description will be given of control of power supply shift performed by the power supply controller 410.

In the first waiting state P100, no power is supplied to the power supply controller 410. When the user turns on the main switch 302, the power supply controller 410 supplies power to the image forming apparatus. This causes the image forming apparatus to start from an initialized state and then shift to the standby state P101.

In the standby state P101, when a first predetermined shift requirement is satisfied, the image forming apparatus shifts from the standby state P101 to the power saving state P102. An example of the first shift requirement is that there elapses a time period (shift-to-power saving state time) set for the image forming apparatus or the user instructs to shift the image forming apparatus to the power saving state P102.

Anyway, when the image forming apparatus has not been used for the time period (shift-to-power saving state time) set in advance, the CPU 401 creates a power saving memory image in the RAM 403, and causes the image forming apparatus to shift from the standby state P101 to the power saving state P102.

In the power saving state P102, when a second predetermined shift requirement is satisfied, the image forming apparatus shifts from the power saving state P102 to the standby state P101 (corresponding to an operation of a second control unit). An example of the second shift requirement is that the energy saving key 804 appearing in FIG. 4 is depressed or a print job is input via the external interface 451.

More specifically, upon detection of satisfaction of a shift-to-standby state requirement (return factor), the return factor-detecting section 411 notifies the power supply controller 410 of the fact. This causes the power supply controller 410 to perform power supply control to thereby cause the image forming apparatus to shift from the power saving state P102 to the standby state P101.

In the standby state P101, when a third predetermined shift requirement is satisfied, the image forming apparatus shifts from the standby state P101 to the first waiting state P100. An example of the third shift requirement is that the second waiting state P103 has been set to be disabled and at the same time the main switch 302 is turned off.

When the third shift requirement is satisfied, the CPU 401 executes shutdown of the image forming apparatus, and instructs the power supply controller 410 to shift the image forming apparatus to the first waiting state P100. This causes the image forming apparatus to shift from the standby state P101 to the first waiting state P100. Note that when recreating the above-described standby memory image, the image forming apparatus once shifts to the first waiting state P100.

In the standby state P101, when a fourth predetermined shift requirement is satisfied, the image forming apparatus shifts from the standby state P101 to the second waiting state P103. An example of the fourth shift requirement is that the second waiting state P103 has been set to be enabled and at the same time the main switch 302 is turned off.

When the fourth shift requirement is satisfied, the CPU 401 stores the standby memory image in the RAM 403, and instructs the power supply controller 410 to shift the image forming apparatus to the second waiting state P103. This causes the image forming apparatus to shift from the standby state P101 to the second waiting state P103.

In the second waiting state P103, when a fifth predetermined shift requirement is satisfied, the image forming apparatus shifts from the second waiting state P103 to the standby state P101 (first control unit). An example of the fifth shift requirement is that the main switch 302 is turned on by the user. When the fifth shift requirement is satisfied, the power supply controller 410 supplies power to the image forming apparatus to shift the image forming apparatus from the second waiting state P103 to the standby state P101.

In the power saving state P102, when a sixth predetermined shift requirement is satisfied, the image forming apparatus shifts from the power saving state P102 to the first waiting state P100. An example of the sixth shift requirement is that when the image forming apparatus is in the power saving state P102, the second waiting state P103 has been set to be disabled and at the same time the main switch 302 is turned off.

When the sixth shift requirement is satisfied, the power supply controller 410 performs power supply control to cause the image forming apparatus to shift from the power saving state P102 to the first waiting state P100.

In the power saving state P102, when a seventh predetermined shift requirement is satisfied, the image forming apparatus shifts from the power saving state P102 to the second waiting state P103. An example of the seventh shift requirement is that when the image forming apparatus is in the power saving state P102, the second waiting state P103 has been set to be enabled and at the same time the main switch 302 is turned off.

When the seventh shift requirement is satisfied, the power supply controller 410 performs power supply control to cause the image forming apparatus to shift from the power saving state P102 to the second waiting state P103.

Figure 7:
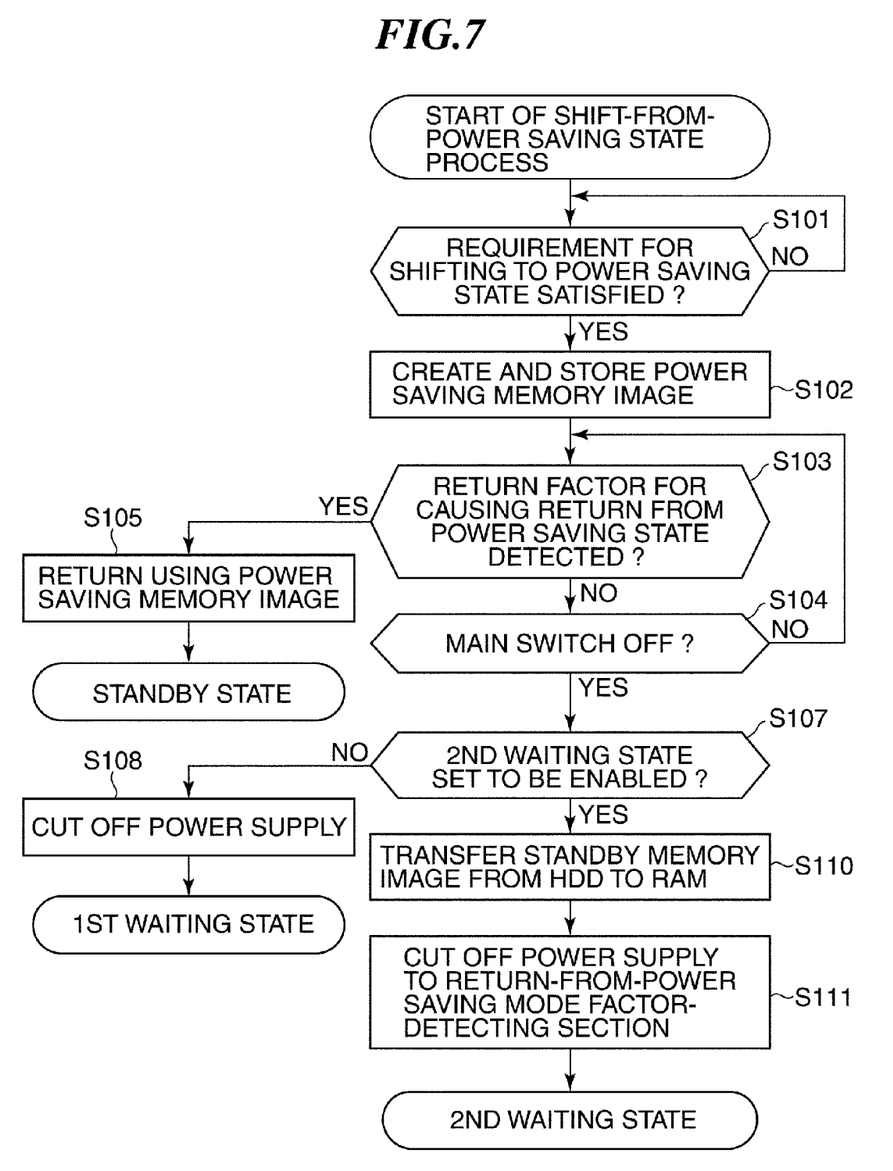
FIG. 7 is a flowchart of a shift-from-power saving state process executed by the image forming apparatus according to the first embodiment when the image forming apparatus shifts from a power saving state to another state.

FIG. 7 is a flowchart of a shift-from-power saving state process executed by the image forming apparatus according to the first embodiment when the image forming apparatus shifts from the power saving state to another state.

Referring to FIGS. 5 to 7, let it be assumed that the image forming apparatus is now in the standby state P101. The CPU 401 (control processor) determines whether or not a requirement for shifting the image forming apparatus to the power saving state P102 has been satisfied (step S101). If the requirement for shifting the image forming apparatus to the power saving state P102 has not been satisfied (NO to the step S101), the CPU 401 remains on standby. In this embodiment, as mentioned hereinabove, when the user has depressed the energy saving key 804 of the console section 800 or when the predetermined shift-to-power saving state time has elapsed, it is regarded that the requirement for shifting the image forming apparatus to the power saving state P102 has been satisfied.

When the requirement for shifting the image forming apparatus to the power saving state P102 (shift-to-power saving state requirement) has been satisfied (YES to the step S101), the CPU 401 creates the above-described power saving memory image, and stores the same in the RAM 403 (main storage device: main memory) (step S102).

Then, when the CPU 401 notifies the power supply controller 410 of an instruction for shifting the image forming apparatus to the power saving state P102, the power supply controller 410 turns off the second switch 306. This shifts the image forming apparatus from the standby state P101 to the power saving state P102.

The power saving memory image represents the status of the image forming apparatus immediately before shifting to the power saving state P102. For example, the power saving memory image includes the status of the CPU 401, the statuses of the electronic devices connected to the CPU 401, and the operating states of the OS and applications. To cause the image forming apparatus to return from the power saving state P102, the restoring process for returning from the power saving state P102 is executed using the power saving memory image. The data of the power saving memory image includes contents of the data save areas of a system memory and a video memory as memory areas managed by the OS.

When the image forming apparatus has been shifted to the power saving state P102, the power supply controller 410 monitors whether or not the return factor-detecting section 411 has detected a return factor for causing the image forming apparatus to return from the power saving state P102 to the standby state P101 (step S103). If no return factor has been detected (NO to the step S103), the power supply controller 410 monitors whether or not the main switch 302 has been turned off (step S104). If the main switch 302 has not been turned off (NO to the step S104), the power supply controller 410 returns to the step S103.

If a return factor has been detected in the step S103 (YES to the step S103), the return factor-detecting section 411 instructs the power supply controller 410 to cause the image forming apparatus to return to the standby state P101. In response to the instruction, the power supply controller 410 turns on the second switch 306 to thereby activate the power supply from the second power supply 307. On the other hand, the CPU 401 performs a return operation using the power saving memory image stored in the RAM 403 (step S105), to thereby cause the image forming apparatus to shift from the power saving state P102 to the standby state P101.

If it is determined in the step S104 that the main switch 302 has been turned off (YES to the step S104), the power supply controller 410 determines whether or not the second waiting state P103 has been set to be enabled in the image forming apparatus (step S107). If the second waiting state P103 has been set to be disabled (NO to the step S107), the power supply controller 410 determines that the image forming apparatus is to be caused to shift from the power saving state P102 to the first waiting state P100. Then, the power supply controller 410 turns off the first power supply 304 to thereby cut off power supply to the blocks that are supplied with power in the power saving state P102 (step S108). As a consequence, power supply to the image forming apparatus is stopped, whereby the image forming apparatus shifts from the power saving state P102 to the first waiting state P100.

If the second waiting state P103 has been set to be enabled (YES to the step S107), the power supply controller 410 starts preparation for causing the image forming apparatus to shift to the second waiting state P103. The power supply controller 410 turns on the second switch 306, and temporarily starts the CPU 401, the HDD 407, and so forth. Then, the CPU 401 transfers the standby memory image stored in advance in the HDD 407 to the RAM 403 (step S110).

When the transfer of the standby memory image to the RAM 403 is completed, the power supply controller 410 turns off the first and second switches 305 and 306, and cuts off power supply to the return factor-detecting section 411, etc. (step S111), to thereby cause the image forming apparatus to shift to the second waiting state P103.

Figure 8:
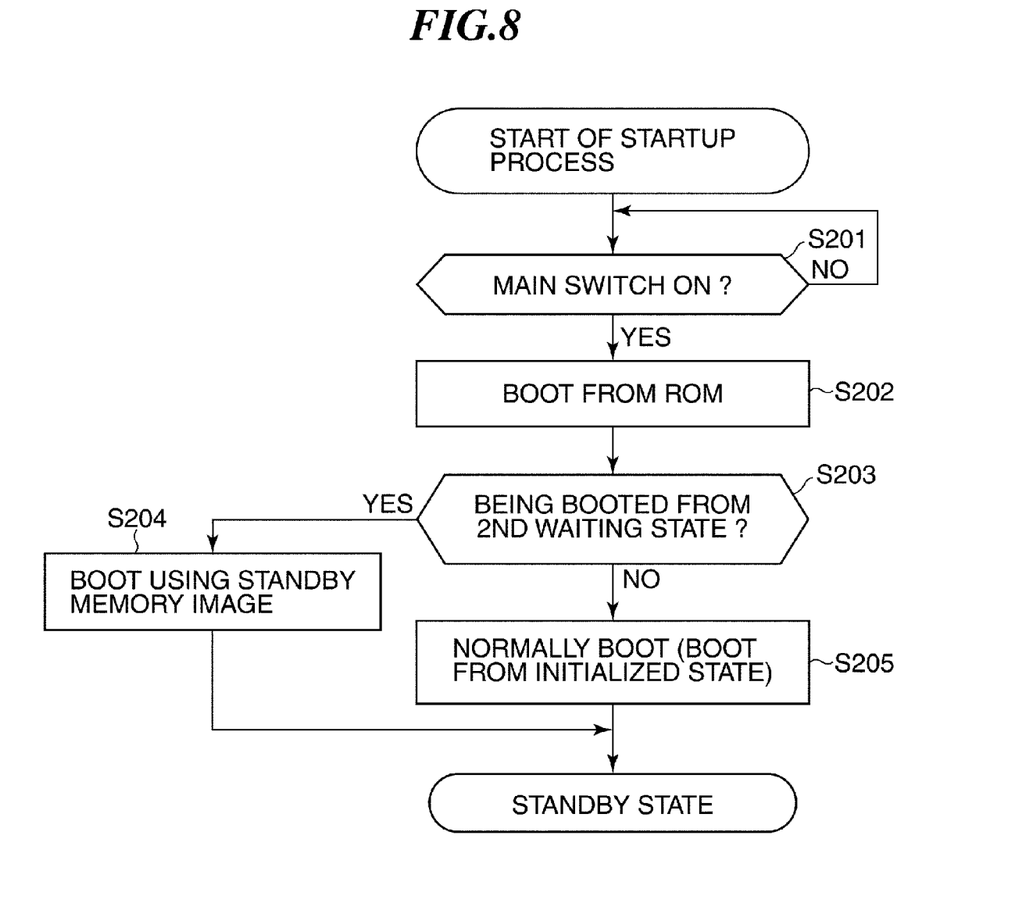

FIG. 8 is a flowchart of a startup process performed when the main switch 302 of the image forming apparatus shown in FIG. 1 is turned on.

Referring to FIGS. 5, 6 and 8, when the main switch 302 is not turned on by the user (NO to a step S201), the startup process is not started. When the user turns on the main switch 302 (YES to the step S201), in order to shift the image forming apparatus to the standby state P101, the power supply controller 410 turns on the first power supply 304 and the first and second switches 305 and 306, and then starts booting from the ROM 402 (step S202).

Then, the CPU 401 checks whether the main switch 302 has been turned on for booting from the second waiting state P103 of the image forming apparatus or from the first waiting state P100 of the same (step S203). Specifically, the CPU 401 refers to settings indicative of whether or not to enable the second standby information stored in the ROM 402, and checks whether the booting is being performed from the second waiting state P103 or from the first waiting state P100.

If the booting is being performed from the second waiting state P103 (YES to the step S203), the CPU 401 continues to boot using the standby memory image stored in the RAM 403 (step S204), to thereby cause the image forming apparatus to shift from the second waiting state P103 to the standby state P101.

If the booting is being performed from the first waiting state P100 (NO to the step S203), it means that booting of the image formatting apparatus is to be executed from the initialized state, and hence the CPU 401 sequentially starts the main program stored in the semiconductor disk 408 and other programs (step S205), to thereby cause the image forming apparatus to shift from the first waiting state P100 to the standby state P101.

As described hereinabove, in the first embodiment, when the main switch 302 is turned off in the power saving state P102 without any return factor causing a return to the standby state P101, if the second waiting state P103 has been set to be enabled, the standby memory image (first status information) stored in the HDD 407 is stored in the RAM (main storage device) 403, and then the image forming apparatus is caused to shift to the second waiting state P103. Therefore, when the main switch 302 is turned on again, the CPU 401 can promptly cause the image forming apparatus to shift to the standby state by using the standby memory image stored in the RAM 403.

Figure 9:
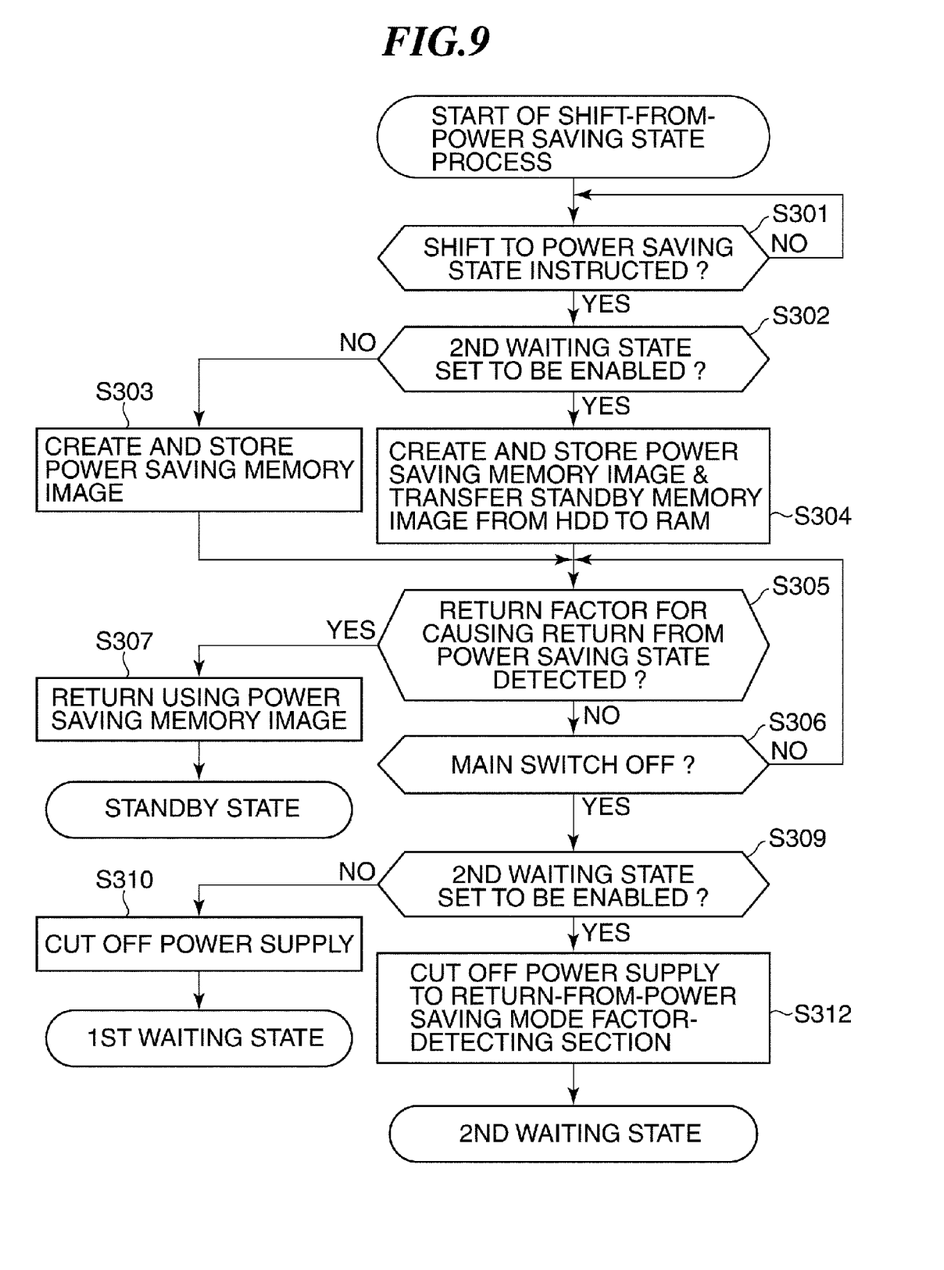
FIG. 9 is a flowchart of a shift-from-power saving state process executed by an image forming apparatus according to a second embodiment of the present invention when the image forming apparatus shifts from the power saving state to another state.

Next, a second embodiment of the present invention will be described. An image forming apparatus according to the second embodiment has the same hardware configuration and software configuration as those of the FIG. 1 image forming apparatus according to the first embodiment, except for processing described with reference to FIG. 9, so that the same components as those of the image forming apparatus according to the first embodiment are denoted by the same reference numerals, and description thereof is omitted. FIG. 9 is a flowchart of a shift-from-power saving state process executed by the image forming apparatus according to the present embodiment when the image forming apparatus shifts from the power saving state to another state.

Referring to FIGS. 5, 6 and 9, let it be assumed that the image forming apparatus is now in the standby state P101. The CPU 401 determines whether or not the requirement for shifting the image forming apparatus to the power saving state P102 has been satisfied (step S301). If the requirement for shifting the image forming apparatus to the power saving state P102 has not been satisfied (NO to the step S301), the CPU 401 remains on standby.

If the requirement for shifting the image forming apparatus to the power saving state P102 has been satisfied (YES to the step S301), in a case where the image forming apparatus is to be shifted to the power saving state P102, the CPU 401 determines whether or not the second waiting state P103 has been set to be enabled for the image forming apparatus (step S302).

If the second waiting state P103 has been set to be disabled (NO to the step S302), the CPU 401 creates a power saving memory image, and stores the same in the RAM 403 (step S303). Then, the CPU 401 notifies the power supply controller 410 of a shift of the image forming apparatus to the power saving state P102. In response to the notification, the power supply controller 410 performs power supply control to cause the image forming apparatus to shift from the standby state P101 to the power saving state P102. Then, the process proceeds to a step S305, described hereinafter.

If the second waiting state P103 has been set to be enabled (YES to the step S302), the CPU 401 creates a power saving memory image, and stores the same in the RAM 403. Further, the CPU 401 transfers a standby memory image stored in advance in the HDD 407 to the RAM 403 (step S304). Then, the CPU 401 notifies the power supply controller 410 of a shift of the image forming apparatus to the power saving state P102. In response to the notification, the power supply controller 410 turns off the second switch 306, to thereby cause the image forming apparatus to shift from the standby state P101 to the power saving state P102.

As described above, the standby memory image is stored in the RAM 403 before the image forming apparatus shifts from the standby state P101 to the power saving state P102, whereby even in a case where the main switch 302 is turned off in the power saving state P102, there is no need to turn on the second switch 306 so as to store the standby memory image in the RAM 403. This enables the image forming apparatus to promptly shift from the power saving state P102 to the second waiting state P103.

When the image forming apparatus has shifted to the power saving state P102, the power supply controller 410 monitors whether or not the return factor-detecting section 411 has detected a return factor causing a return from the power saving state P102 to the standby state P101 (step S305). If no return factor has been detected (NO to the step S305), the power supply controller 410 monitors whether or not the main switch 302 has been turned off (step S306). If the main switch 302 has not been turned off (NO to the step S306), the power supply controller 410 returns to the step S305.

If a return factor has been detected in the step S305 (YES to the step S305), the return factor-detecting section 411 instructs the power supply controller 410 to cause the image forming apparatus to return to the standby state P101. In response to the instruction, the power supply controller 410 turns on the second switch 306. On the other hand, the CPU 401 performs a return operation using the power saving memory image stored in the RAM 403 (step S307), to thereby cause the image forming apparatus to shift from the power saving state P102 to the standby state P101.

If it is determined in the step S306 that the main switch 302 has been turned off (YES to the step S306), the power supply controller 410 determines whether or not the second waiting state P103 has been set to be enabled for the image forming apparatus (step S309). If the second waiting state P103 has been set to be disabled (NO to the step S309), the power supply controller 410 determines that the image forming apparatus is to be caused to shift from the power saving state P102 to the first waiting state P100. Then, the power supply controller 410 turns off the first power supply 304, and cuts off power supply to the blocks that are supplied with power in the power saving state P102 (step S310). As a consequence, the image forming apparatus is caused to shift from the power saving state P102 to the first waiting state P100.

If the second waiting state P103 has been set to be enabled (YES to the step S309), the power supply controller 410 turns off the first switch 305, and stops power supply to the return factor-detecting section 411 (step S312), to cause the image forming apparatus to shift from the power saving state P102 to the second waiting state P103.

As described above, in the second embodiment, when the image forming apparatus shifts from the standby state P101 to the power saving state P102, if the second waiting state P103 has been set to be enabled, the power saving memory image and the standby memory image are stored in the RAM 403. If there is detected no return factor to the standby state P101 when in the power saving state P102, but the main switch 302 is turned off, the image forming apparatus is caused to shift, on condition that the second waiting state P103 has been set to be enabled, to the second waiting state P103.

If a return factor to the standby state P101 is detected in the power saving state P102, the CPU 401 causes the image forming apparatus to shift to the standby state P101 using the power saving memory image stored in the RAM 403. Further, when the main switch 302 is turned on again, the CPU 401 causes the image forming apparatus to shift to the standby state P101 using the standby memory image stored in the RAM 403.

Therefore, when the image forming apparatus is in the power saving state P102 or the second waiting state P103, it is possible to cause the image forming apparatus to promptly shift to the standby state P101.

Note that although in the above description, the information processing apparatus is described by taking the image forming apparatus as an example, this is not limitative, but the present invention can also be applied to other information processing apparatuses, such as a personal computer (PC) and a cellular phone.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the functions of either of the above-described embodiments can be accomplished by causing the image processing apparatus to execute the functions as a control method. Further, the functions of either of the above-described embodiments may be accomplished by causing a computer incorporated in the information processing apparatus to execute a program implementing the functions, as a control program. Note that the control program is stored e.g. in a computer-readable storage medium.

In this case, the control method and the control program each include at least power supply control and shifting of modes.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-195042 filed Sep. 7, 2011, which is hereby incorporated by reference herein in its entirety.

What is claimed is:

1. An information processing apparatus that has a plurality of power modes, comprising:

an information processing unit configured to perform information processing;

a storage unit configured to store information used by the information processing unit; and a power supply control unit configured to shift the information processing apparatus to one of a standby mode, a first power saving mode, and a second power saving mode where power consumption of the information processing apparatus is lower than in the standby mode and higher than in the first power saving mode, wherein the power supply control unit is configured to supply power to the information processing unit and the storage unit, when the information processing apparatus is in the standby mode, supply power to the storage unit without supplying power to the information processing unit, when the information processing apparatus is in the first power saving mode, and supply power to the storage unit without supplying power to the information processing unit, when the information processing apparatus is in the second power saving mode, wherein the power supply control unit is configured to shift, in a case where a power switch is turned off in the state of the second power saving mode, the information processing apparatus to the first power saving mode after temporarily shifting to the standby mode, and wherein the information processing unit is configured to:

transfer first status information preliminarily stored in a memory where power is supplied in the standby mode but not in the first and second power saving modes to the storage unit in the state of the temporarily shifted standby mode, and cause the information processing apparatus to start up by using the first status information stored in the storage unit, in a case where the power switch is turned on in the state of the first power saving mode.

2. The information processing apparatus according to claim 1, further comprising a second control unit configured to cause the information processing apparatus to shift from the second power saving mode to the standby mode by using second status information stored in the storage unit, and wherein the information processing unit creates the second status information to the storage unit such that the storage unit stores the first status information and the second status information in the state of the second power saving mode.

3. The information processing apparatus according to claim 2, wherein the information processing unit stores the first status information and the second status information in the storage unit before the information processing apparatus is shifted from the standby mode to the second power saving mode.

4. The information processing apparatus according to claim 2, wherein the second status information indicates a status of the information processing apparatus in the standby mode immediately before the information processing apparatus is shifted to the second power saving mode.

5. The information processing apparatus according to claim 1, further comprising an auxiliary storage unit configured to have the first status information stored therein in advance, and wherein the information processing unit transfers the first status information to be stored from the auxiliary storage unit to the storage unit.

6. The information processing apparatus according to claim 1, wherein the storage unit is a non-volatile memory.

7. The information processing apparatus according to claim 1, further comprising a setting unit configured to set the first power saving mode to be enabled or to be disabled.

8. The information processing apparatus according to claim 1, further comprising an image forming unit configured to perform image formation on a sheet.

9. An information processing apparatus that has a plurality of power modes, comprising:

an information processing unit configured to perform information processing;

a storage unit configured to store information used by the information processing unit; and a power supply control unit configured to shift the information processing unit to one of a standby mode, a first power saving mode, and a second power saving mode where power consumption of the information processing apparatus is lower than in the standby mode and higher than in the first power saving mode, wherein the power supply control unit is configured to supply power to the information processing unit and the storage unit, when the information processing apparatus is in the standby mode, supply power to the storage unit without supplying power to the information processing unit, when the information processing apparatus is in the first power saving mode, and supply power to the storage unit without supplying power to the information processing unit, when the information processing apparatus is in the second power saving mode, wherein the information processing unit is configured to transfer first status information preliminarily stored in a memory where power is supplied in the standby mode but not in the first and second power saving modes to the storage unit in a case where a shift-to-power saving state requirement defined in advance is satisfied in the state of the standby mode, wherein the power supply control unit is configured to:
shift the information processing apparatus from the standby mode to the second power saving mode after the first status information is transferred to the storage unit, and shift, when a power switch is turned off in the state of the second power saving mode, the information processing apparatus to the first power saving mode, and wherein the information processing unit is configured to cause the information processing apparatus to start up by using the first status information stored in the storage unit, in a case where the power switch is turned on in the state of the first power saving mode.

10. The information processing apparatus according to claim 9, further comprising a second control unit configured to cause the information processing apparatus to shift from the second power saving mode to the standby mode by using second status information stored in the storage unit, and wherein the information processing unit creates the second status information to the storage unit such that the storage unit stores the second status information in the state of the second power saving mode.

11. The information processing apparatus according to claim 10, wherein the information processing unit stores the second status information in the storage unit before the information processing apparatus is shifted from the standby mode to the second power saving mode.

12. The information processing apparatus according to claim 10, wherein the second status information indicates a status of the information processing apparatus in the standby mode immediately before the information processing apparatus is shifted to the second power saving mode.

13. The information processing apparatus according to claim 9, further comprising an auxiliary storage unit configured to have the first status information stored therein in advance, and wherein the information processing unit transfers the first status information to be stored from the auxiliary storage unit to the storage unit.

14. The information processing apparatus according to claim 9, wherein the storage unit is a non-volatile memory.

15. The information processing apparatus according to claim 9, further comprising a setting unit configured to set the first power saving mode to be enabled or to be disabled.

16. The information processing apparatus according to claim 9, further comprising an image forming unit configured to perform image formation on a sheet.

17. A method of controlling an information processing apparatus that has a plurality of power modes, comprising:

supplying power to an information processing unit configured to perform information processing and a storage unit that stores information used by the information processing unit;

shifting the information processing apparatus to one of a standby mode, a first power saving mode, and a second power saving mode, where power consumption of the information processing apparatus is lower than in the standby mode and higher than in the first power saving mode, wherein power is supplied to the information processing unit and the storage unit, when the information processing apparatus is in a standby mode, power is supplied to the storage unit without supplying power to the information processing unit, when the information processing apparatus is in the first power saving mode, and power is supplied to the storage unit without supplying power to the information processing unit, when the information processing apparatus is in the second power saving mode;

shifting, in a case where a power switch is turned off in the state of the second power saving mode, the information processing apparatus to the first power saving mode after temporarily shifting to the standby mode;

transferring first status information preliminarily stored in a memory where power is supplied in the standby mode but not in the first and second power saving modes to the storage unit in the state of the temporarily shifted standby mode; and causing the information processing apparatus to start up by using the first status information stored in the storage unit in a case where the power switch is turned on in the state of the first power saving mode.

18. A method of controlling an information processing apparatus that has a plurality of power modes, comprising:

supplying power to an information processing unit that performs information processing and a storage unit that stores information used by the information processing unit;

shifting the information processing apparatus to one of a standby mode, a first power saving mode, and a second power saving mode, where power consumption of the information processing apparatus is lower than in the standby mode and higher than in the first power saving mode, wherein power is supplied to the storage unit without supplying power to the information processing unit, when the information processing apparatus is in the first power saving mode, wherein power is supplied to the storage unit without supplying power to the information processing unit, when the information processing apparatus is in the second power saving mode;

shifting, in a case where a power switch is turned off in the state of the second power saving mode, the information processing apparatus to the first power saving mode after temporarily shifting to the standby mode;

transferring first status information preliminarily stored in a memory where power is supplied in the standby mode but not in the first and second power saving modes to the storage unit in the state of the temporarily shifted standby mode; and causing the information processing apparatus to start up by using first status information stored in the storage unit, in a case where the power switch is turned on in the state of the first power saving mode.

19. A non-transitory computer-readable storage medium storing a computer-executable program for causing a computer to execute a method of controlling an information processing apparatus that has a plurality of power modes, wherein the method comprises:

supplying power to an information processing unit that performs information processing and a storage unit that stores information used by the information processing unit;

shifting the information processing apparatus to one of a standby mode, a first power saving mode, and a second power saving mode, where power consumption of the information processing apparatus is lower than in the standby mode and higher than in the first power saving mode, wherein power is supplied to the storage unit without supplying power to the information processing unit, when the information processing apparatus is in the first power saving mode, and power is supplied to the storage unit without supplying power to the information processing unit, when the information processing apparatus is in the second power saving mode;

shifting, in a case where a power switch is turned off in the state of the second power saving mode, the information processing apparatus to the first power saving mode after temporarily shifting to the standby mode;

transferring first status information preliminarily stored in a memory where power is supplied in the standby mode but not in the first and second power saving modes to the storage unit in the state of the temporarily shifted standby mode; and causing the information processing apparatus to start up by using first status information stored in the storage unit, in a case where the power switch is turned on in the state of the first power saving mode.

20. A non-transitory computer-readable storage medium storing a computer-executable program for causing a computer to execute a method of controlling an information processing apparatus that has a plurality of power modes, wherein the method comprises:

supplying power to an information processing unit that performs information processing and a storage unit that stores information used by the information processing unit;

shifting the information processing apparatus to one of a standby mode, a first power saving mode, and a second power saving mode, where power consumption of the information processing apparatus is lower than in the standby mode and higher than in the first power saving mode, wherein power is supplied to the storage unit without supplying power to the information processing unit, when the information processing apparatus is in the first power saving mode and power is supplied to the storage unit without supplying power to the information processing unit, when the information processing apparatus is in the second power saving mode;

shifting, in a case where a power switch is turned off in the state of the second power saving mode, the information processing apparatus to the first power saving mode after temporarily shifting to the standby mode;

transferring first status information preliminarily stored in a memory where power is supplied in the standby mode but not in the first and second power saving modes to the storage unit in the state of the temporarily shifted standby mode; and causing the information processing apparatus to start up by using first status information stored in the storage unit, in a case where the power switch is turned on in the state of the first power saving mode.

* * * * *